(12) United States Patent
Beekmann

(10) Patent No.: US 9,356,411 B2
(45) Date of Patent: May 31, 2016

(54) SLIP RING ASSEMBLY

(71) Applicant: Wobben Properties GmbH, Aurich (DE)

(72) Inventor: Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/371,693

(22) PCT Filed: Jan. 11, 2013

(86) PCT No.: PCT/EP2013/050520
§ 371 (c)(1),
(2) Date: Jul. 10, 2014

(87) PCT Pub. No.: WO2013/107699
PCT Pub. Date: Jul. 25, 2013

(65) Prior Publication Data
US 2014/0375062 A1      Dec. 25, 2014

(30) Foreign Application Priority Data

Jan. 16, 2012   (DE) .......................... 10 2012 200 561

(51) Int. Cl.
*F03D 9/00* (2006.01)
*H02P 9/04* (2006.01)
*H01R 39/08* (2006.01)
(Continued)

(52) U.S. Cl.
CPC ................ *H01R 43/14* (2013.01); *F03D 9/002* (2013.01); *H01R 39/08* (2013.01); *H01R 43/10* (2013.01); *H02K 13/003* (2013.01); *H01R 39/24* (2013.01); *Y02E 10/725* (2013.01); *Y10T 29/49011* (2015.01)

(58) Field of Classification Search
CPC ..... Y02E 10/723; Y02E 10/725; Y02E 10/72; Y02E 10/74; H02P 2009/004; H01R 43/08; H01R 43/06; H01R 39/08; H01R 39/34; H02K 13/04; H02K 13/02
USPC .......................... 290/55, 44; 29/597; 310/232
See application file for complete search history.

(56) References Cited

U.S. PATENT DOCUMENTS

| 2,563,279 A | * | 8/1951 | Rushing .................. F03D 1/025 |
| | | | 290/55 |
| 3,316,519 A | * | 4/1967 | Maytone ................ H01R 39/00 |
| | | | 310/227 |

(Continued)

FOREIGN PATENT DOCUMENTS

| CN | 201518379 U | 6/2010 |
| CN | 202076657 U | 12/2011 |

(Continued)

OTHER PUBLICATIONS

Machine translation in English of JP2006107925A dated Apr. 2006.*

*Primary Examiner* — Tulsidas C Patel
*Assistant Examiner* — Charles Reid, Jr.
(74) *Attorney, Agent, or Firm* — Seed Intellectual Property Law Group PLLC

(57) ABSTRACT

The invention concerns a method of reconditioning a slip ring transmitter of the gold wire type which has a slip ring, in particular a gold ring, for use with a gold wire board as the circuit board, including the steps: removing a gold wire board from the slip ring transmitter, and fitting a multi-brush board as a replacement for the gold wire board.

5 Claims, 2 Drawing Sheets

(51) Int. Cl.
  *H01R 43/14*   (2006.01)
  *H01R 43/10*   (2006.01)
  *H02K 13/00*   (2006.01)
  *H01R 39/24*   (2006.01)

(56) References Cited

U.S. PATENT DOCUMENTS

| | | | | |
|---|---|---|---|---|
| 3,351,440 | A | * | 11/1967 | Clauss ................ H01H 1/0203 419/10 |
| 4,039,848 | A | * | 8/1977 | Winderl ................ F03D 1/025 290/55 |
| 4,068,909 | A | * | 1/1978 | Jacobson ............... H01R 39/00 29/876 |
| 4,098,546 | A | * | 7/1978 | Swartz ................ H01R 39/643 310/231 |
| 4,366,387 | A | * | 12/1982 | Carter, Jr. ............. F03D 1/0608 290/44 |
| 4,398,113 | A | * | 8/1983 | Lewis .................... H01R 39/18 310/232 |
| 6,105,243 | A | * | 8/2000 | Okabe ................ H01L 21/4853 257/E23.068 |
| 6,956,300 | B2 | * | 10/2005 | Gizara ................. F03B 17/061 290/42 |
| 7,449,794 | B2 | | 11/2008 | Guey et al. |
| 8,740,543 | B2 | * | 6/2014 | Weaver ................... B63B 35/44 290/44 |
| 2008/0143110 | A1 | | 6/2008 | Guey et al. |
| 2008/0258469 | A1 | * | 10/2008 | Stephens ................ F03D 3/002 290/55 |
| 2008/0293260 | A1 | * | 11/2008 | Christoffersen ..... H01R 13/187 439/33 |
| 2009/0045627 | A1 | | 2/2009 | Cairo et al. |
| 2010/0283252 | A1 | * | 11/2010 | Fradella ............... H02K 1/2793 290/55 |

FOREIGN PATENT DOCUMENTS

| | | |
|---|---|---|
| DE | 24 58 991 A1 | 7/1975 |
| DE | 694 14 687 T2 | 6/1999 |
| DE | 10 2007 060 985 A1 | 6/2009 |
| EP | 0 054 380 A2 | 6/1982 |
| EP | 0 662 736 A1 | 7/1995 |
| GB | 1 499 998 | 2/1978 |
| JP | 2004-301087 A | 10/2004 |
| JP | 2006-107925 A | 4/2006 |
| JP | 2009-043558 A | 2/2009 |
| JP | 2009-225578 A | 10/2009 |
| JP | 2010-232139 A | 10/2010 |
| JP | 2004-108164 A | 8/2015 |
| KR | 2020110006687 A | 7/2011 |
| WO | 2009/130277 A1 | 10/2009 |

* cited by examiner

SLIP RING ASSEMBLY

BACKGROUND

1. Technical Field

The present invention concerns a slip ring transmitter and a method of reconditioning a slip ring transmitter. The present invention further concerns a wind power installation having a slip ring transmitter.

2. Description of the Related Art

Wind power installations are generally known and a typical installation is shown in FIG. 1. There the aerodynamic rotor rotates in usual operation relative to the stationary part of the pod, being driven by wind. To exchange electric energy or electric signals from the stationary part to the rotating part, namely the rotor, a slip ring transmitter is usually provided. In particular energy can be transmitted to so-called pitch motors which can adjust the rotor blades of the rotor in their angle of incidence. In addition for example energy can be transmitted for an electric blade heating system, if provided.

A particularity applies for gearless wind power installations which use an externally excited synchronous generator. In the case of such wind power installations an exciter current for producing an electromagnetic field in the generator rotor member is transmitted by way of the slip ring carrier or by way of a separate slip ring carrier. In that case current of high power, which can be several hundreds of kW has to be transmitted.

In particular the following three types of slip ring transmitters are known. The oldest option involves causing a carbon brush to rub against a corresponding contact ring to transmit the electric signal, whether it is an information signal or an energy signal, from the carbon brush to the contact ring or vice-versa. Such carbon brushes have become well-established and their properties are generally known. They are generally inexpensive but require regular replacement of the carbon brushes.

A so-called 'gold wire slip ring transmitter' is used to give an improvement. In that case a board having a large number of gold wires which basically project as in the case of a needle bed is guided on a corresponding slip ring which is electrically and mechanically matched to those gold wires. This gives in particular the advantage that a good contact property with a low level of abrasion wear is achieved by the choice of material, by using gold. Nonetheless with the passage of time deposits occur here at the positions of the respective gold wires, on the corresponding slip ring in grooves produced therein, in which faults can also occur, in particular in the gold layer. The slip ring usually comprises brass or a similar metal alloy provided with a gold layer in the contact region. Oil can be provided in the grooves for cooling purposes and for improving contacting. With a small amount of oil and/or a high degree of wear or in a severely worn condition the gold wire rubs against the slip ring and changes the surface there, which however can be difficult to detect. As a result the gold wire also suffers and wears away more quickly.

A so-called 'multi-brush slip ring transmitter' is proposed as a further improvement. In that case at least one bundle of many wires which are as fine as hairs runs against a corresponding slip ring. Such bundles or bunches of those many hair-fine wires are usually arranged, fixed and contacted on a circuit board and therefore reference is usually made here only to a circuit board, which includes the above-mentioned bundles or bunches. The circuit board thus forms a circuit board and is thus the counterpart to the slip ring against which it rubs. The circuit board can also be referred to as the brush. Those terms basically apply irrespective of the technology which is actually employed. Basically contacting occurs here on the basis of the principle that the wires can bear against the corresponding slip ring with little force and good contacting is effected simply by the large number of wires. That bundle is similar to a brush so that the term 'multi-brush' has also gained acceptance in German linguistic usage in the corresponding technical circles. Such a multi-brush technology can be handled in comparatively robust manner and avoids the above-described deposits involved in the gold wire technology and carbon abrasion in the case of carbon brushes.

A problem with the gold wire system is in particular that, besides the gold wires, the corresponding slip ring also wears. Deposits and defects occur on the slip ring, which in turn lead to severe wear of the gold wires. After corresponding wear therefore, in addition to the gold wire board with the gold wires, the slip ring also has to be replaced, which is complicated, expensive and thus undesirable.

The German Patent and Trade Mark Office searched the following state of the art in the priority application in relation to the present application: DE 24 58 991 B2; DE 10 2007 060 985 A1; DE 694 14 687 T2; U.S. Pat. No. 4,398,113 A and JP 2009-225578A.

BRIEF SUMMARY

One or more embodiments of the present invention may address at least one of the above-mentioned problems. In particular one embodiment seeks to provide a solution in which slip ring transmitters of the 'gold wire' type, that is to say slip ring transmitters which are constructed in accordance with the described gold wire system, can be reconditioned as easily and inexpensively as possible if they are corresponding severely worn. The invention at least seeks to provide an alternative configuration.

According to one embodiment of the invention there is proposed a method that involves replacing one of a plurality of boards. It is also possible to provide a plurality of different technologies in a slip ring transmitter such as for example a gold wire technology for the transmission of signals involving a low current, for example 0.5 to 3 A, and a carbon brush technology for the transmission of signals involving high currents, for example 5 to 500 A. According to an embodiment of the invention a slip ring transmitter of the gold wire type is reconditioned. That slip ring transmitter includes, at any event prior to reconditioning, at least one slip ring, in particular a gold ring, on the one hand, and a gold wire circuit board provided with gold wires as the gold wire brush which rubs against the slip ring, on the other hand. More specifically, for reconditioning the slip ring transmitter, in particular after wear has occurred which necessitates reconditioning, the gold wire board is removed from the slip ring transmitter and a multi-brush board is used as a replacement for that gold wire board.

More specifically it was realized that the board of the multi-brush technology can be used together with the slip ring of the gold wire technology. Thus a worn gold wire board can be replaced by a multi-brush board, whereby it is possible to avoid replacing the slip ring of the gold wire type. By virtue of that replacement of the gold wire board by the multi-brush board the slip ring transmitter which at least originally was completely one of the gold wire type can be easily and inexpensively reconditioned.

Preferably reconditioning is effected for a slip ring transmitter in which the gold ring already has grooves which occurred due to use with the gold wire board. It was realized here that the multi-brush board is also suitable for use with a slip ring of the gold wire type if that slip ring has grooves. The board of the multi-brush technology is capable of adapting to the contact surface of the slip ring, as it has turned out. In particular the board of the multi-brush technology can also engage into the grooves in the slip ring. The slip ring which already has grooves because of wear therefore does not need to be replaced and it can remain in the slip ring transmitter. Hitherto, in the case of a worn slip ring transmitter involving gold wire technology, the gold wire board and the slip ring would generally have had to be replaced because a new gold wire board, namely the gold wires, wears away quickly due to the described faults and as a result the life expectancy is drastically shortened.

Preferably in the exchange the multi-brush board is fitted in such a way that it rubs on the slip ring and penetrates into the grooves and in the grooves and outside the grooves produces electric contacts between the multi-brush board and the slip ring involving the gold wire technology. Thus it is possible to further use a slip ring of the gold wire type which already has considerable grooving.

In addition there is proposed a slip ring transmitter which includes a slip ring involving gold wire technology and which in particular includes a gold ring. Such a gold ring correspondingly has gold constituents for increasing conductivity in particular in a transition to a circuit board. That slip ring is thus adapted for use with a gold wire board. In addition the slip ring transmitter includes a multi-brush board which rubbingly contacts the gold wire technology slip ring. Thus there is proposed a slip ring transmitter which essentially consists of a combination of a slip ring using gold wire technology and a board using multi-brush technology, or which substantially has those elements.

Advantageously the slip ring has at least one groove produced by a gold wire board. The proposed slip ring transmitter is thus a solution in which parts of a slip ring transmitter which otherwise would have to be replaced because of their wear condition are put to further use. In particular replacement of the gold wire slip ring can be avoided or at least delayed.

In addition there is proposed a wind power installation having a slip ring transmitter according to at least one of the described embodiments. Electric signals can be transmitted by that slip ring transmitter from the stationary part of a pod to the rotating part of a pod, namely the aerodynamic rotor. Accordingly it is proposed that the slip ring transmitter is used in such a way that it transmits electric signals, whether they are information signals and/or power signals, from the stationary part of the pod to the aerodynamic rotor. Depending on the respective wind power installation, a plurality of different electric signals have to be transmitted by way of such a slip ring transmitter.

Accordingly such a slip ring transmitter can be complicated and expensive. Added to that is the fact that its arrangement in the region of the transition from the stationary part to the rotating part of the pod of the wind power installation, which represents a preferred position for the slip ring transmitter, makes the latter difficult for access and the proposed solution which avoids or at least delays replacement of a slip ring of the gold wire type thus affords a particularly advantageous effect.

In a further embodiment it is proposed that the slip ring transmitter be used in a gearless wind power installation. The gearless nature of the wind power installation has consequences in regard to its structure overall and also the necessary currents of the generator overall. As a result corresponding demands are made on the slip ring transmitter and the specified advantages can then be enjoyed to a particular degree.

Preferably an externally excited synchronous machine is used as the generator. In that case an exciter current also has to be transmitted to the rotor member of the synchronous machine and thus by way of the slip ring transmitter. A slip ring transmitter described in accordance with at least one of the embodiments is advantageously to be provided in particular for that purpose. In particular that slip ring transmitter has to be adapted for the transmission of corresponding currents and corresponding powers. An advantageous slip ring transmitter and thus a wind power installation having such an advantageous slip ring transmitter is in a position to transmit currents in the region of some hundreds of amperes by way of the multi-brush board to the slip ring of the gold wire type, in particular to the grooved slip ring of the gold wire type. For example 5 A to 500 A can be involved. Preferably the slip ring transmitter is arranged in or at a shaft journal which entirely or partially carries the aerodynamic rotor. In particular that shaft journal faces with a front tip in the direction of the wind in regular operation of the installation and the slip ring transmitter is preferably arranged in or at that tip of the shaft journal. Thus electric signals can be transmitted from the stationary part of the pod by way of the shaft journal to the slip ring transmitter and from same to the rotating part, namely the aerodynamic rotor. Depending on the actual specific configuration and size of the wind power installation access to such a slip ring transmitter is difficult and it is possible here to achieve a reduced maintenance implementation by the described reconditioning of a slip ring transmitter of one of the foregoing embodiments and/or by the use of a slip ring transmitter according to one of the correspondingly described embodiments. In addition, depending on the actual specific configuration of the wind power installation, replacement of elements of a slip ring transmitter arranged in the tip of the shaft journal can also represent a safety risk for the operating personnel performing that operation. Such safety risks are thus avoided or at least reduced by the proposed solutions.

BRIEF DESCRIPTION OF THE SEVERAL VIEWS OF THE DRAWINGS

The invention is described in greater detail hereinafter by means of embodiments with reference to the accompanying Figures.

DETAILED DESCRIPTION

Hereinafter the same references can denote similar but non-identical elements to emphasize the functional relationship of those elements.

Figure 1:
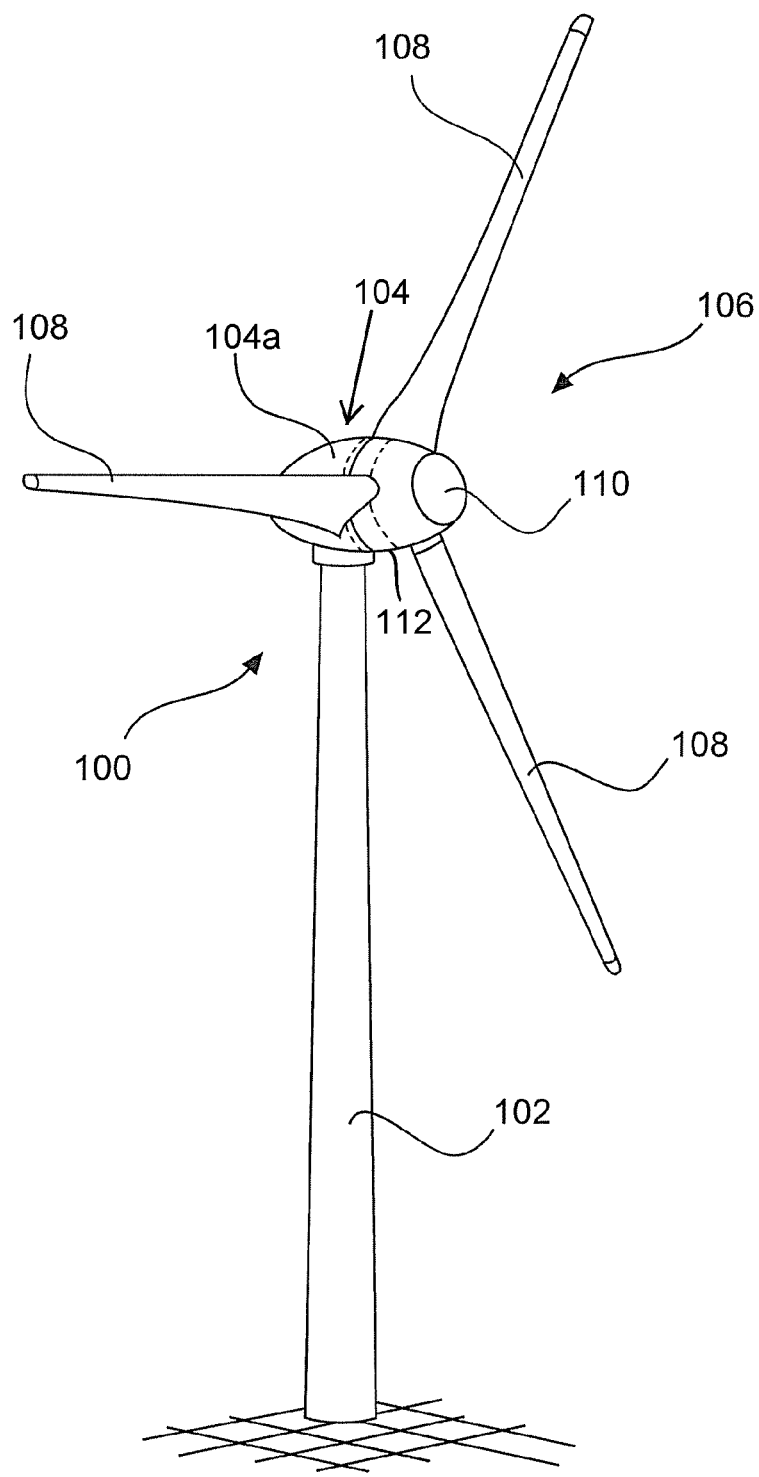
FIG. 1 shows a wind power installation.

FIG. 1 shows a wind power installation 100 comprising a pylon 102 and a pod 104. Arranged at the pod 104 is a rotor 106 having three rotor blades 108 and a spinner 110. In 1 operation the rotor 106 is caused to rotate by the wind and thereby drives a generator 112 in the pod 104.

FIG. 1 shows a gearless wind power installation 100 which uses a slip ring 1 transmitter to transmit electric signals from the stationary part 104a of the pod 104 to the rotor 106, namely in particular the spinner 110. The illustrated wind power installation uses an externally excited synchronous generator for which the exciter current is transmitted from the stationary part of the pod 104 to the spinner 110 by way of the slip ring transmitter. In addition the illustrated wind power installation 100 has rotor blades 108 which are adjustable in their angle of incidence. To adjust the angle of incidence of those rotor blades 108 both information for adjustment purposes and also adjustment energy are transmitted from the stationary part of the pod 104 to the spinner 110 by way of the slip ring transmitter. It is pointed out that the reference to the stationary part of the pod 104 is used to mean that this is immobile in respect of an axis of rotation. It will be appreciated that wind tracking, so-called azimuth adjustment, that is to say rotation about a vertical axis, for the entire pod 104 can be effected. The rotor 106 rotates relative to the stationary part of the pod 104 about a substantially horizontal axis. In that case the wind power installation 100 is one of the type of horizontal-axis wind power installations.

Figure 2:
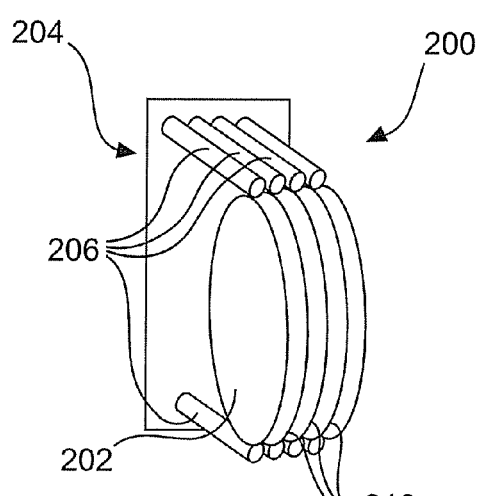
FIG. 2 diagrammatically shows a slip ring transmitter of the gold wire type.

FIG. 2 shows a slip ring transmitter 200 involving gold wire technology or of the gold wire type having a gold wire slip ring 202 and a gold wire circuit board 204. The gold wire board 204 has various gold wires 206 of which FIG. 2 illustratively shows twice times four. The gold wires 206 are also electrically connected to the board 204, this being effected by solder points. The gold wires 206 are pressed against the gold wire slip ring 202 by the gold wire board 204 and thereby produce electric contact.

FIG. 2 shows the slip ring transmitter 200 in a condition after prolonged use and thus in a condition involving a certain amount of wear. For that reason there are already grooves 212 which have been caused by some of the gold wires 206. For illustration purposes, shown here are three grooves 212, accordingly, more specifically coming from the left in FIG. 2 the second, fourth and fifth gold wire have each caused a respective quite deep groove. The first and third gold wires 206 have not accordingly resulted in any groove. In actual fact all gold wires which make electric contact with the gold wire slip ring will usually have left behind a groove, after a certain period of operation. It will be noted however that the grooves are usually of different depths and accordingly the gold wires 206 leave behind on the gold wire slip ring 202 an irregular profile which is illustrated here by showing only three grooves 212.

If now the gold wire board 204 were to be replaced by a new one, all gold wires 206 would again be of the same length so that those gold wires 206 which would be arranged in the region of a groove 212 would not make electric contact with the gold wire slip ring 202. Selective replacement of a gold wire board 204 is thus at least disadvantageous, if not out of the question.

Figure 3:
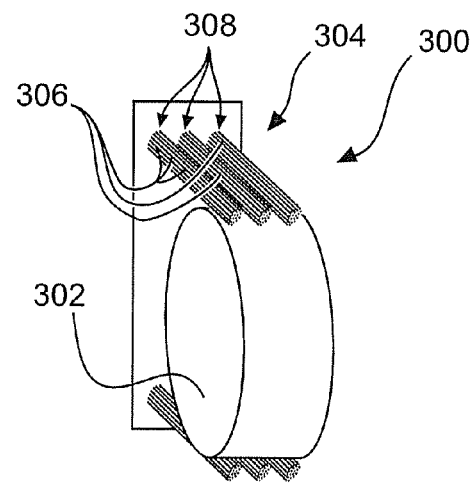
FIG. 3 diagrammatically shows a slip ring transmitter of the multi-brush type.

FIG. 3 shows a slip ring transmitter 300 involving the multi-brush technology. This slip ring transmitter 300 includes a multi-brush slip ring transmitter 302 on which a multi-brush board 304 runs. The board 304 has very many individual wires or hairs 306 which are applied similarly to a brush to the slip ring 302 and thereby lead to a countless amount of small contact points so that overall current can be transmitted from or to the slip ring 302 overall by the many small wires or hairs 306. The hairs 306 are bundled in bunches 308.

Because of the many small wires or hairs 306 which are arranged in a brush-like configuration, this basically does not afford a clearly definable contact point for each wire 306 because they are not arranged sufficiently rigidly for that purpose. Accordingly, even over a prolonged period of operation, no grooving occurs, as was the case with the slip ring transmitter using the gold wire technology and as is shown in FIG. 2. In actual fact nowadays slip ring transmitters of the multi-brush type are preferred to those using the gold wire system.

Figure 4:
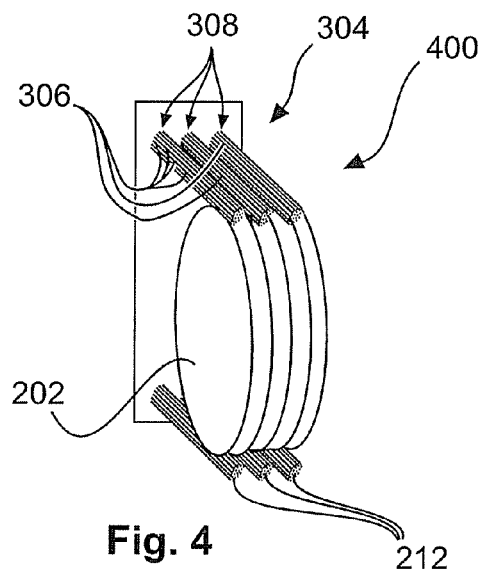
FIG. 4 shows a slip ring transmitter with a slip ring of the gold wire type and a board of the multi-brush type, FIG. 5 diagrammatically shows on an enlarged scale a transitional region between a gold wire board and a slip ring of a slip ring transmitter of the gold wire type, and FIG. 6 diagrammatically shows on an enlarged scale the transition of a board of the multi-brush type to a slip ring with grooves of the gold wire type.

FIG. 4 shows a combined slip ring transmitter 400 as is proposed as a solution. This combined slip ring transmitter 400 has by way of illustration a gold wire slip ring 202, as is shown in FIG. 2, and it co-operates with a board 304 of the multi-brush type, as is shown in FIG. 3. The many wires or hairs 306 are basically pressed gently against the gold wire slip ring 202 and individually adapt to the surface and thus also to the grooves 212. It has thus proven to be advantageous for the gold wire board 204 to be replaced after wear by a multi-brush board 304 as shown in FIG. 3. In particular however a brush is specifically adapted to the slip ring of the gold wire type, insofar as a wire bunch can be provided for each groove or for a plurality of grooves of the slip ring.

Figure 5:
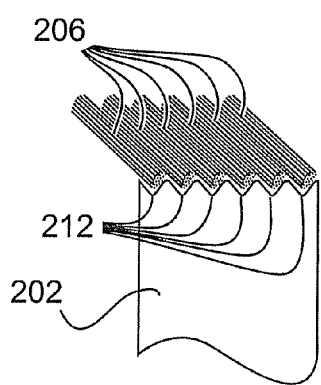

FIG. 5 shows a diagrammatic view on an enlarged scale to illustrate contacting between the gold wires 206 and the gold wire slip ring 202. In accordance therewith it is shown that—viewed from the left in FIG. 5—the second, fourth and fifth gold wires 206 are longer than the first and third gold wires 206. The first and third gold wires 206 may accordingly be worn more severely whereas the other three gold wires, the second, fourth and fifth, have resulted in grooving being formed in the gold wire slip ring. Those grooves 212 have been gradually formed and at the same time wear of the gold wires 206 has occurred so that the two are matched to each other. It is thus disadvantageous, with the condition shown in FIG. 5, to replace only the gold wires 206, that is to say the gold wire board, by a fresh board with gold wires which are each of the same length.

Figure 6:
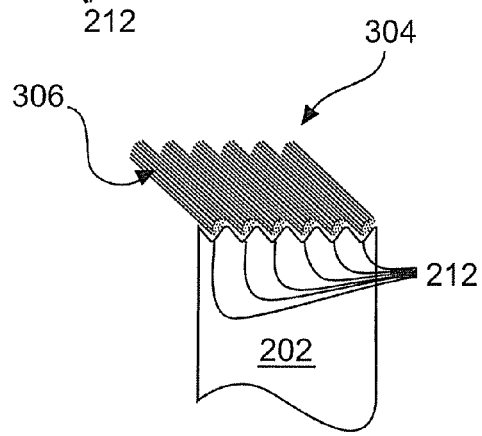

It was thus realized that the board 304 of the multi-brush type as shown in FIG. 3 which was originally adapted to a corresponding slip ring 302 is suitable for being adapted to the created profile, in particular the grooves 212 of the gold wire slip ring 202. That is shown in the enlarged simplified view in FIG. 6. Accordingly the board 304 which is only partly shown in FIG. 6 is matched with its many small wires or hairs 306 in particular to the grooves 212. That adaptation is effected by the fine hairs 306 being bent to different degrees, which cannot be seen in the view in FIG. 6 because of the perspective view used there. Moreover, both FIG. 5 and also FIG. 6 show in principle a sectional view through the gold wire slip ring 202, although no section hatching is shown for reasons of clarity of the drawing.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
   a pod including a stator portion and a rotor portion;
   a generator in the pod; and
   a slip ring transmitter configured to transmit electrical signals from the stator portion to the rotor portion, the slip ring transmitter including:
      a slip ring having an outer gold layer with a plurality of grooves that were caused from wear by a plurality of gold wires, wherein each gold wire of the plurality of gold wires had formed a respective groove, the grooves having different depths, wherein the grooves in the slip ring cause the the plurality of gold wires to be ineffective in making electrical contact therebetween; and
      a multi-brush board that includes a plurality of bundles of wires, to replace the plurality of gold wires the bundle of wires having ends that extends into the plurality of grooves, respectively, to make contact with the slip ring, each of the bundle of wires making electrical contact between the bundle of wires and the slip ring.

2. The wind power installation according to claim 1 wherein the generator is a gearless generator.

3. The wind power installation according to claim 1 wherein the slip ring transmitter is adapted for the transmission of an exciter current.

4. The wind power installation according to claim 1 wherein the plurality of bundles of wires are individually bent for the ends to make contact with the slip ring.

5. The wind power installation according to claim 1 wherein the generator is an externally excited synchronous generator.

* * * * *